US010700532B2

(12) United States Patent
Lu (10) Patent No.: US 10,700,532 B2
(45) Date of Patent: Jun. 30, 2020

(54) CHARGING AND DISCHARGING SYSTEM AND METHOD WITH ANTI-COUNTERFEITING FUNCTION OF BATTERY PACK FOR ELECTRIC TOOL

(71) Applicants: SUZHOU THORTRONIC INTELLIGENT TECHNOLOGY CO.,LTD, Suzhou, Jiangsu (CN); Guanxiong Lu, Suzhou, Jiangsu (CN)

(72) Inventor: Guanxiong Lu, Jiangsu (CN)

(73) Assignee: SUZHOU THORTRONIC INTELLIGENT TECHNOLOGY CO., LTD, Suzhou, Jiangsu (CN)

( * ) Notice: Subject to any disclaimer, the term of this patent is extended or adjusted under 35 U.S.C. 154(b) by 74 days.

(21) Appl. No.: 16/162,270

(22) Filed: Oct. 16, 2018

(65) Prior Publication Data
US 2019/0089164 A1 Mar. 21, 2019

(30) Foreign Application Priority Data

Jul. 24, 2018 (CN) .......................... 2018 1 0838336

(51) Int. Cl.
*H02J 7/00* (2006.01)
*H02J 7/02* (2016.01)
*H01M 10/42* (2006.01)

(52) U.S. Cl.
CPC ............ *H02J 7/00038* (2020.01); *H02J 7/00* (2013.01); *H02J 7/0029* (2013.01); *H02J 7/0045* (2013.01); *H02J 7/027* (2013.01); *H01M 10/4257* (2013.01); *H02J 7/00045* (2020.01)

(58) Field of Classification Search
USPC ................ 320/106, 107, 108, 109, 110, 134
See application file for complete search history.

(56) References Cited

U.S. PATENT DOCUMENTS

| 2016/0087314 | A1* | 3/2016 | Arashima | ............... B60L 53/65 320/134 |
| 2016/0099575 | A1* | 4/2016 | Velderman | ............ H02J 7/0042 307/72 |
| 2018/0277801 | A1* | 9/2018 | Brozek | ............... H01M 2/0212 |
| 2019/0006980 | A1* | 1/2019 | Sheeks | ............... H01M 10/425 |

* cited by examiner

*Primary Examiner* — Brian Ngo (57) ABSTRACT

A charging and discharging system with anti-counterfeiting function of a battery pack for an electric tool includes: a battery pack which includes a data acquisition module and a battery pack verification module; and at least one charge-discharge adapter which includes an adapter verification module, an adapter controller, and a discharging communication verification module. The adapter verification module communicates with the battery pack verification module for performing anti-counterfeiting verification, if the anti-counterfeiting verification is passed, the at least one charge-discharge adapter controls the battery pack to charge or discharge; the adapter controller receives data information from the data acquisition module and controls the discharging communication verification module to work, the discharging communication verification module selects a corresponding communication protocol according to a type of the discharge interface of the at least one charge-discharge adapter for communicating with the electric tool and controls the battery pack to charge the electric tool.

20 Claims, 5 Drawing Sheets

Fig. 3C

CHARGING AND DISCHARGING SYSTEM AND METHOD WITH ANTI-COUNTERFEITING FUNCTION OF BATTERY PACK FOR ELECTRIC TOOL

CROSS REFERENCE OF RELATED APPLICATION

The present invention claims priority under 35 U.S.C. 119(a-d) to CN 201810838336.3, filed Jul. 24, 2018.

BACKGROUND OF THE PRESENT INVENTION

Field of Invention

The present invention relates to the technical field of battery pack charging and discharging, and more particular to a charging and discharging system and method of a battery pack for an electric tool or a garden tool.

Description of Related Arts

Tools such as electric tools and garden tools are widely used in people's production and life. Different types of electric tools are suitable for different types of mechanical work. In general, electric tools mostly comprise motors or engines for driving the workpiece. In order to drive a motor or engine that is configured in an electric tool to perform different types of mechanical work, these electric tools are typically connected to a battery or directly connected to an alternating current main power source. At present, most of the hand-held electric tools use a battery as a main power source, and the battery is a rechargeable battery.

For battery-powered electric tools, there is no uniform charging and discharging protection standard for each manufacturer and brand, and the structures are also different. Usually a battery-powered too comprises a charger, a battery pack and an electric tool. When the battery pack is charged and discharged, different manufacturers adopt different schemes, and the mechanical interfaces are also different. Since the battery pack is a consumable item, the subsequent battery packs are inconvenient to replace: either the same brand of battery pack is used, and the price is very expensive; or there is no subsequent battery pack to replace. In addition, for electric tools with different bands, battery packs are unable to be used with each other, reducing the efficiency of the battery packs.

For different battery-operated electric tools on the market, one user will purchase different types of electric tools with different brands according to different usage requirements, which increases the confusion and waste caused by the incompatibility of battery packs; multiple chargers and battery packs which are unable to incompatible with each other not only waste a lot of money and space, but also bring management difficulties to users.

SUMMARY OF THE PRESENT INVENTION

In view of the above-discussed shortcomings of the prior art, it is an object of the present invention to provide a charging and discharging system which is capable of charging a plurality of different types of electric tools with a shared battery pack and has an anti-counterfeiting function.

In order to achieve the above object, the present invention provides a charging and discharging system with anti-counterfeiting function of a battery pack for an electric tool, comprising:

the battery pack which comprises a data acquisition module and a battery pack verification module, wherein the data acquisition module is configured to collect voltage and temperature of a battery cell of the battery pack; and at least one charge-discharge adapter which comprises an adapter verification module, an adapter controller, and a discharging communication verification module, wherein the at least one charge-discharge adapter has a discharge interface and a charge interface, wherein:

the adapter verification module communicates with the battery pack verification module for performing anti-counterfeiting authentication, if the anti-counterfeiting authentication is passed, the at least one charge-discharge adapter controls the battery pack to charge or discharge;

the adapter controller is connected with both the discharging communication verification module and the data acquisition module, the adapter controller receives data information from the data acquisition module and controls the discharging communication verification module to work, the discharging communication verification module selects a corresponding communication protocol according to a type of the discharge interface of the at least one charge-discharge adapter for communicating with the electric tool and controls the battery pack to charge the electric tool;

the discharge interface of the at least one charge-discharge adapter is configured to match with a charge port of the electric tool.

Preferably, the at least one charge-discharge adapter further comprises a charging communication verification module for selecting another corresponding communication protocol according to a type of the charge interface of the at least one charge-discharge adapter for communicating with a first charger and controls the first charger to charge the battery pack, wherein the charging communication verification module is connected with the adapter controller.

Preferably, the charging and discharging system with anti-counterfeiting function of the battery pack for the electric tool further comprises a second charger, wherein the second charger comprises a charger verification module which communicates with the battery pack verification module for performing verification; after passing the verification of the battery pack verification module, the second charger directly charges the battery pack.

Preferably, the battery pack verification communicates with the adapter verification module in an induction or contact mode.

Preferably, the adapter verification module and the battery pack verification module are paired RFID (radio frequency identification) tags, paired RFID modules, or paired Bluetooth communication modules.

Preferably, the battery pack further comprises a network communication module for sending service conditions to a server.

Preferably, the charging and discharging system with anti-counterfeiting function of the battery pack for the electric tool, further comprises an external communication verification module which communicates with the battery pack verification module, wherein a verification mode and a charging mode are inputted through the external communication verification module, so that the battery pack adopts a corresponding mode to charge the electric tool.

Also, the present invention provides a charging and discharging method of a battery pack for an electric tool, comprising steps of:

(1) providing the battery pack which comprises a battery pack verification module;
(2) providing a charge-discharge adapter which has a charge interface and a discharge interface, wherein the charge interface is connected with a charger, the discharge interface is connected with the electric tool, the charge-discharge adapter comprises an adapter verification module; and
(3) electrically connecting the charge-discharge adapter with the battery pack, communicating the battery pack verification module with the adapter verification module, wherein the battery pack performs authentication on the charge-discharge adapter, while passing the authentication of the battery pack, the charge-discharge adapter controls the battery pack to charge or discharge; otherwise, the charge-discharge adapter does not work.

Preferably, when charging the battery pack by the charger, the charge-discharge adapter firstly selects a corresponding protocol according to the charge interface of the charge-discharge adapter for communicating with the charger, if the communication is normally performed, the battery pack is charged by the charger; if the communication is abnormally performed, the battery pack is not charged by charger.

Preferably, when charging the electric tool by the battery pack, the electric tool is electrically connected with the charge-discharge adapter, the charge-discharge adapter firstly selects a corresponding protocol according to the discharge interface of the charge-discharge adapter for communicating with the electric tool, if the communication is normally performed, the electric tool is charged by the battery pack; if the communication is abnormally performed, the electric tool is not charged by the battery pack.

As described above, the present invention has beneficial effects as follows. The charging and discharging system of the battery pack for the electric tool provided by the present invention comprises the battery pack and at least one charge-discharge adapter. In use, authentication is firstly performed through the battery pack and the charge-discharge adapter to determine whether the battery pack is a genuine battery pack for achieving the anti-counterfeiting authentication. When charging the battery pack or charging the electric tool with the battery pack, it is necessary to perform authentication, and then performing subsequent operations after authentication. The charging and discharging system of the battery pack for the electric tool provided by the present invention is able to realize the shared use of the battery pack, and the user often only needs to purchase one type of battery pack to meet charging requirements of various electric tools; and simultaneously, authentication is required between the battery pack and the charge-discharge adapter, which also plays the role of anti-counterfeiting. Obviously, the present invention is able to ensure that battery pack is compatible with multiple electric tools while preventing the counterfeit products from affecting the efficiency of the enterprises and the safety of the products, and to ultimately reduce the amount of batteries using different brands and reduce battery maintenance costs, give full play to battery pack resource sharing, and reduce use cost of users.

In the drawings, 1: battery pack; 11: data acquisition module; 12: battery pack verification module; 13: network communication module; 2: charge-discharge adapter; 21: adapter verification module; 22: adapter controller; 23: charging communication verification module; 24: discharging communication verification module; 3: first charger; 4: electric tool; 5: external communication verification module; 6: second charger; 61: charger verification module.

DETAILED DESCRIPTION OF THE PREFERRED EMBODIMENT

The present invention is further described with reference to specific embodiments in detail as follows, and those skilled in the art can easily understand other advantages and effects of the present invention through the disclosure of the present invention.

Figure 1:
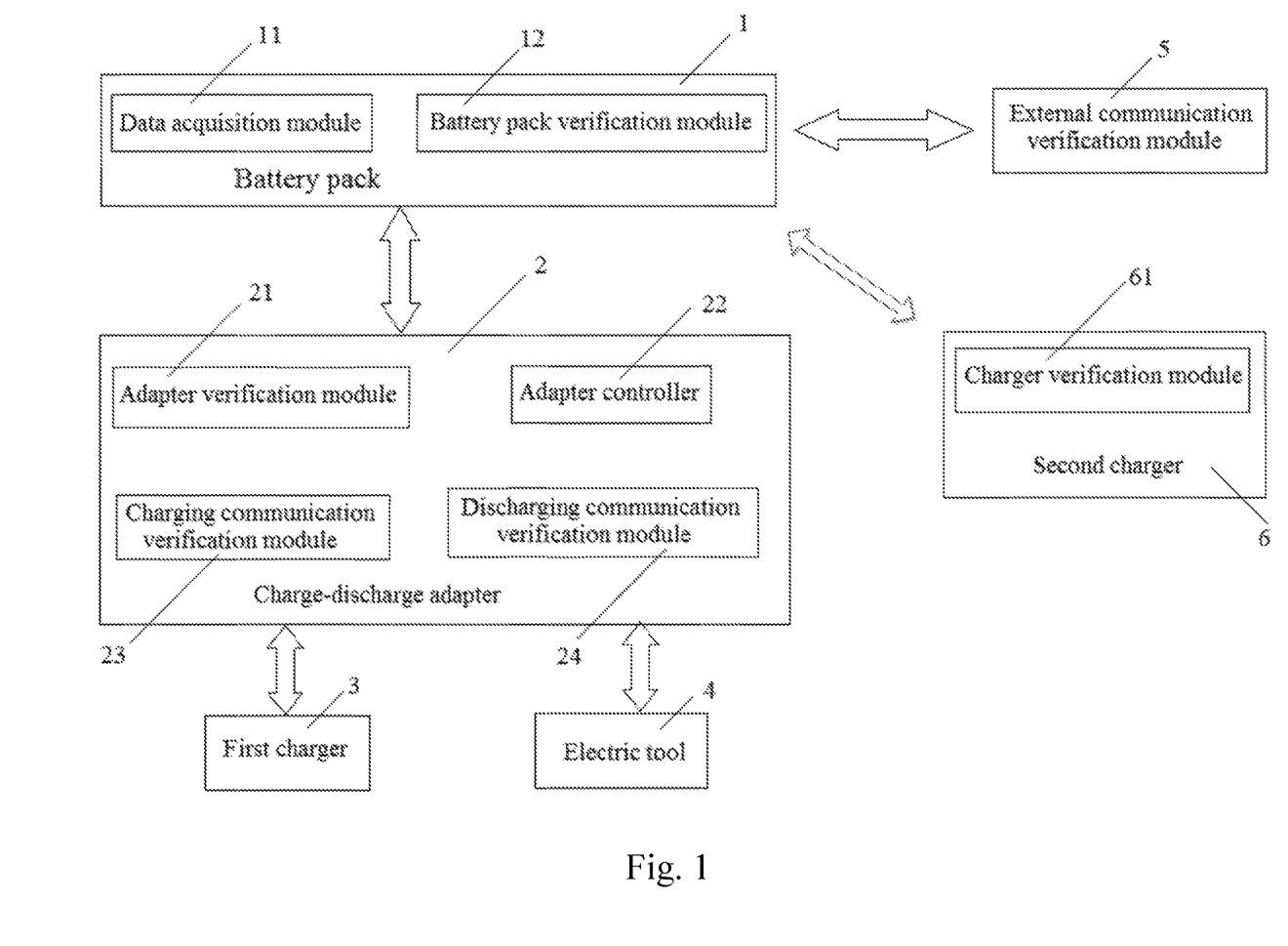
FIG. 1 is a structural block diagram of a charging and discharging system with anti-counterfeiting function of a battery pack for an electric tool provided by the present invention.

As shown in FIG. 1, a charging and discharging system with anti-counterfeiting function of a battery pack for an electric tool is illustrated, which comprises the battery pack 1 and at least one charge-discharge adapter 2, wherein: the at least one charge-discharge adapter 2 is electrically connected with the battery pack 1 for charging and discharging the electric tool; here, the terminology of "discharging" means that the battery pack discharges, namely, the electric tool is charged by the battery pack 1. When there are multiple charge-discharge adapters 2, the multiple charge-discharge adapters 2 are different in type. The at least one charge-discharge adapter 2 has a discharge interface and a charge interface, the charge interface is corresponding to a charger with corresponding type, and the discharge interface is corresponding to a charge port of the electric tool. Different electric tools are respectively corresponding to different charge-discharge adapters, which are adapted for electric tools and garden tools of all brands on the market.

The battery pack 1 comprises a data acquisition module 11 and a battery pack verification module 12, wherein the data acquisition module 11 is configured to collect parameters comprising voltage and temperature of a battery cell of the battery pack 1, and send the parameters out through the battery pack verification module 12.

Figure 2:
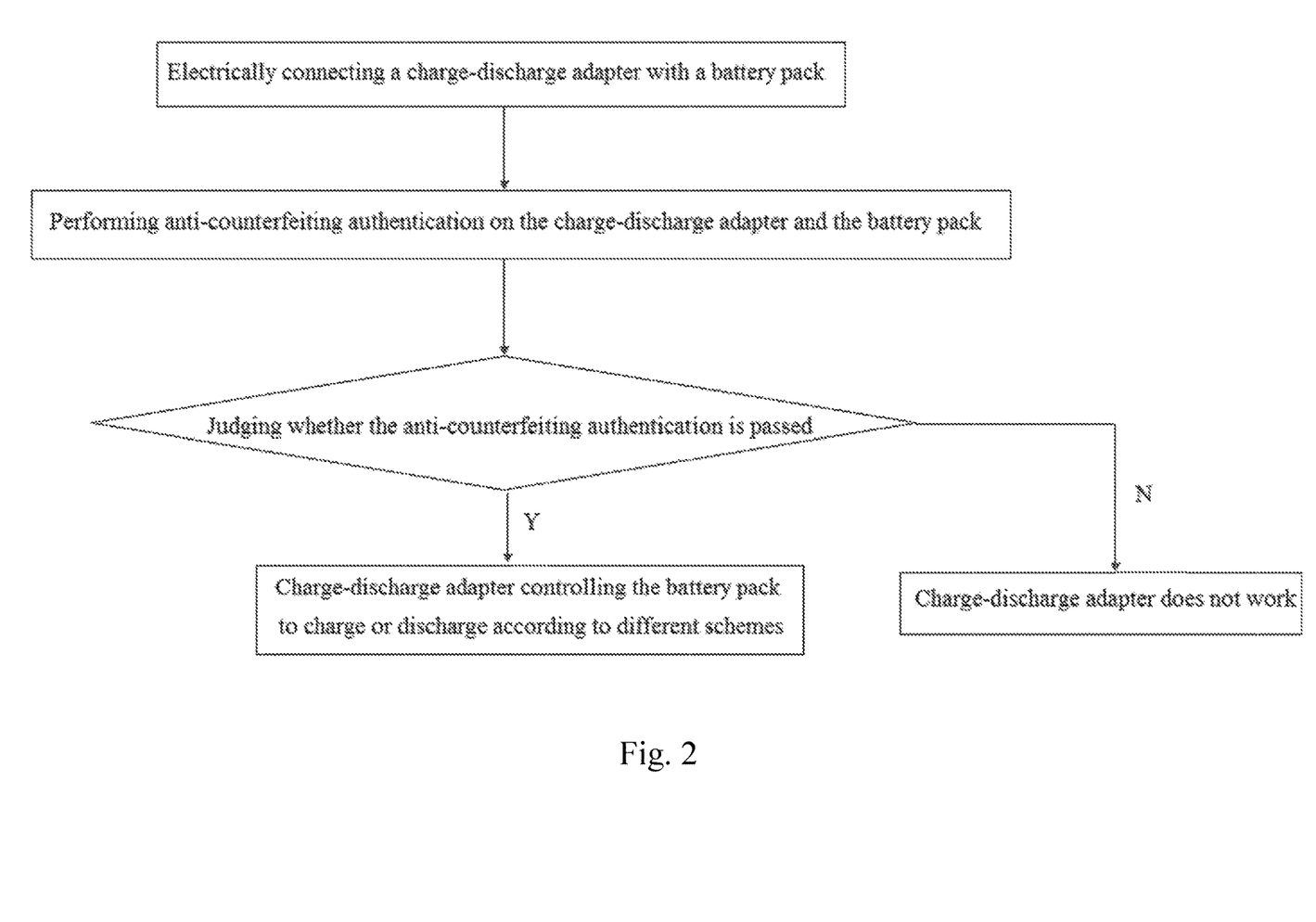
FIG. 2 is a flow chart of a charging and discharging method of a battery pack for an electric tool provided by the present invention.
Figure 3A:
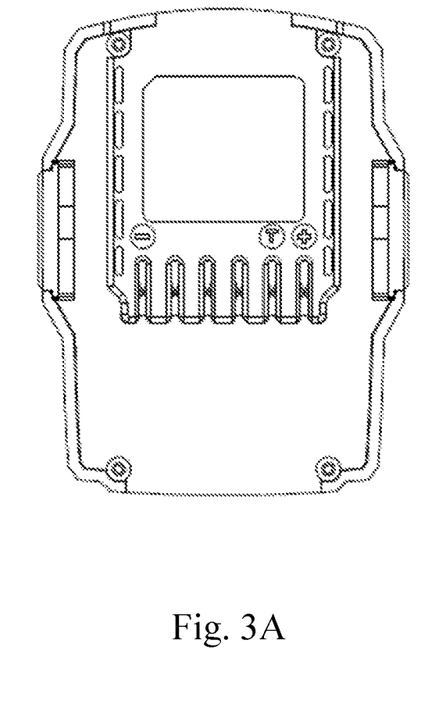
FIG. 3A is a first structurally schematic view of a charge-discharge adapter of the charging and discharging system provided by the present invention.
Figure 3B:
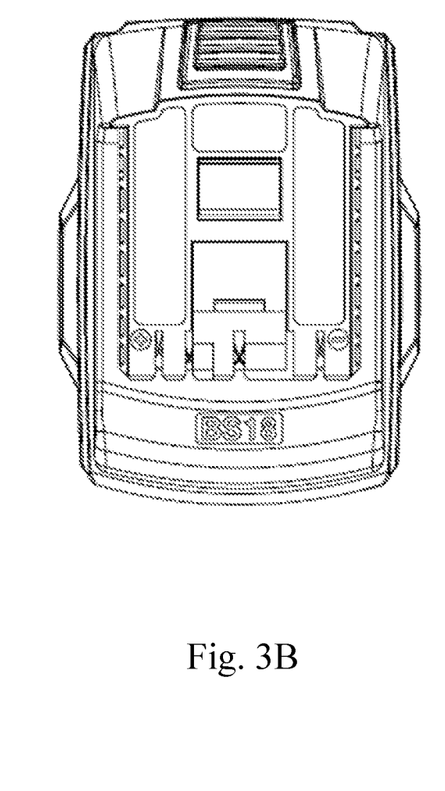
FIG. 3B is a second structurally schematic view of the charge-discharge adapter of the charging and discharging system provided by the present invention.
Figure 3C:
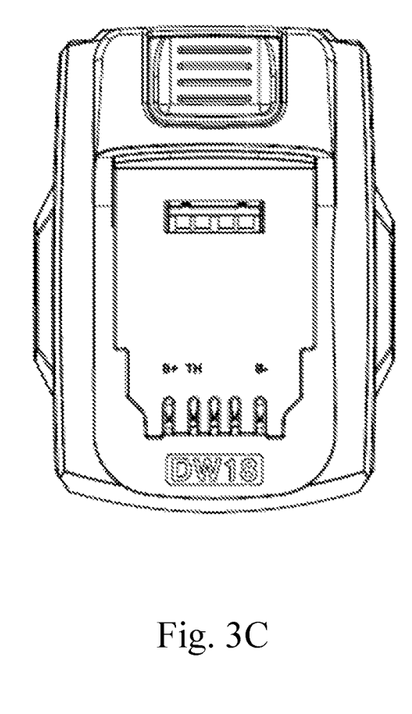
FIG. 3C is a third structurally schematic view of the charge-discharge adapter of the charging and discharging system provided by the present invention.

The at least one charge-discharge adapter 2 comprises an adapter verification module 21, an adapter controller 22, a charging communication verification module 23 and a discharging communication verification module 24. When the at least one charge-discharge adapter 2 is electrically connected with the battery pack 1, the adapter verification module 21 communicates with the battery pack verification module 12 for performing anti-counterfeiting authentication, if the anti-counterfeiting authentication is passed, the at least one charge-discharge adapter 2 is able to control the battery pack 1 to charge or discharge; if the anti-counterfeiting authentication is not passed, the at least one charge-discharge adapter 2 does not work (as shown in FIG. 2). The adapter verification module 21 communicates with the battery pack verification module 12 in a contact communication mode such as a special communication port, or a contactless communication mode such as the adapter verification module 21 and the battery pack verification module 12 are paired RFID (radio frequency identification) tags, paired RFID modules, or paired Bluetooth communication modules. Authentication is required after the adapter verification module 21 of the at least one charge-discharge adapter 2 communicates with the battery pack verification module 12, generally, one party sends a verification code to the other party; when the verification code passes the verification, the battery pack verification module 12 confirms type characteristics of the at least one charge-discharge adapter 2 according to the information of the verification code, and the authentication mode generally adopts the encryption authentication, the battery pack 1 communicates with "every" charge-discharge adapter 2 in an encrypted communication mode, which is able to achieve better anti-counterfeiting effect and prevent a counterfeit universe battery pack from being used.

When the electric tool is charged with the battery pack 1 and the at least one charge-discharge adapter 2, the electric tool 4 is connected with the at least one charge-discharge adapter 2, the charge port of the electric tool 4 matches with the discharge interface of the at least one charge-discharge adapter 2, and at this time, the discharging communication verification module 24 selects a corresponding communication protocol to communicate with the electric tool according to the type of the discharge interface of the at least one charge-discharge adapter 2; if the communication is able to be normally performed, the adapter controller 22 controls the battery pack 1 to charge the electric tool 4; if the communication is unable to be normally performed, the battery pack 1 is unable to charge the electric tool 4.

When the battery pack 1 needs to be charged by the first charger 3 and the at least one charge-discharge adapter 2, the first charger 3 is connected with the at least one charge-discharge adapter 2, and the charging communication verification module 23 selects a corresponding communication protocol to communicate with the first charger 3 according to the type of the charge interface of the at least one charge-discharge adapter 2; if the communication is able to be normally performed, the adapter controller 22 controls the first charger 3 to charge the battery pack 1 according to the corresponding communication protocol; if the communication is unable to be normally performed, and the first charger 3 is unable to charge the battery pack 1.

According to another preferred embodiment, the charging and discharging system of the battery pack for the electric tool further comprises a second charger 6. The second charger 6 comprises a charger verification module 61 which communicates with the battery pack verification module 12 for performing verification; after passing the verification of the battery pack verification module 12, the second charger 6 is able to directly charge the battery pack 1 without the charging communication verification module 23, the verification between the charger verification module 61 and the battery pack verification module 12 is also encrypted.

According to another preferred embodiment, the charging and discharging system of the battery pack for the electric tool further comprises an external communication verification module 5 for communicating with the battery pack verification module 12. The external communication verification module 5 is connected with the battery pack 1 through various wired and wireless connection modes, such as wifi (wireless fidelity), Bluetooth and infrared ray, so as to read out all information in the battery pack 1 such as battery supplier and battery life, also to write into the battery's electrical parameters, manufacturer information and update firmware. Simultaneously, through the external communication verification module 5, the authentication of the at least one charge-discharge adapter 2 is directly performed. When the external communication verification module 5 communicates with the at least one charge-discharge adapter 2, a verification mode and a corresponding charging mode are directly inputted through the external communication verification module 5, so that the battery pack 1 adopts a corresponding mode to directly charge the electric tool, which is adapted for damaged charge-discharge adapters or other emergency situations. The external communication verification module 5 is in an APP (application) form, and simultaneously, the battery pack information of the data acquisition module 11 of the battery pack 1 is directly sent to the external communication verification module 5, so that a user is able to keep track of the battery pack usage.

As another preferred embodiment, the data acquisition module 11 is able to monitor the use of the battery pack 1 in real time. The battery pack 1 further comprises a network communication module 13, and through the data collected by the data acquisition module 11, the usage condition of the battery pack is directly sent to a server via the network communication module 13, so as to achieve cloud monitoring, enabling enterprises to connect with the usage situations of users' battery packs in real time, thereby improving the service.

The charging and discharging system of the battery pack for the electric tool provided by the present invention comprises the battery pack and at least one charge-discharge adapter. In use, authentication is firstly performed through the battery pack and the at least one charge-discharge adapter to determine whether the battery pack is a genuine battery pack for achieving the anti-counterfeiting authentication. When charging the battery pack or charging the electric tool with the battery pack, it is necessary to perform authentication, and then performing subsequent operations after authentication. The charging and discharging system of the battery pack for the electric tool provided by the present invention is able to realize the shared use of the battery pack, and the user often only needs to purchase one type of battery pack to meet charging requirements of various electric tools; and simultaneously, authentication is required between the battery pack and the at least one charge-discharge adapter, which also plays the role of anti-counterfeiting. Obviously, the present invention is able to ensure that battery pack is compatible with multiple electric tools while preventing the counterfeit products from affecting the efficiency of the enterprises and the safety of the products, and to ultimately reduce the amount of batteries using different brands and reduce battery maintenance costs, give full play to battery pack resource sharing, and reduce use cost of users. Therefore, the present invention effectively overcomes various shortcomings in the prior art and has high industrial utilization value.

The above-described embodiments are merely illustrative of the principles and effects of the present invention, and are not intended to limit the present invention. Modifications or variations of the above-described embodiments may be made by those skilled in the art without departing from the spirit and scope of the present invention. Therefore, all equivalent modifications or changes made by those skilled in the art without departing from the spirit and scope of the present invention are still covered by the appended claims of the present invention.

What is claimed is:

1. A charging and discharging system with anti-counterfeiting function of a battery pack for an electric tool, comprising:

the battery pack which comprises a data acquisition module and a battery pack verification module, wherein the data acquisition module is configured to collect voltage and temperature of a battery cell of the battery pack; and at least one charge-discharge adapter which comprises an adapter verification module, an adapter controller, and a discharging communication verification module, wherein the at least one charge-discharge adapter has a discharge interface and a charge interface, wherein:

the adapter verification module communicates with the battery pack verification module for performing anti-counterfeiting authentication, if the anti-counterfeiting authentication is passed, the at least one charge-discharge adapter controls the battery pack to charge or discharge;

the adapter controller is connected with both the discharging communication verification module and the data acquisition module, the adapter controller receives data information from the data acquisition module and controls the discharging communication verification module to work, the discharging communication verification module selects a corresponding communication protocol according to a type of the discharge interface of the at least one charge-discharge adapter for communicating with the electric tool and controls the battery pack to charge the electric tool;

the discharge interface of the at least one charge-discharge adapter is configured to match with a charge port of the electric tool.

2. The charging and discharging system with anti-counterfeiting function of the battery pack for the electric tool, as recited in claim 1, wherein: the at least one charge-discharge adapter further comprises a charging communication verification module for selecting another corresponding communication protocol according to a type of the charge interface of the at least one charge-discharge adapter for communicating with a first charger and controls the first charger to charge the battery pack, wherein the charging communication verification module is connected with the adapter controller.

3. The charging and discharging system with anti-counterfeiting function of the battery pack for the electric tool, as recited in claim 1, further comprising a second charger, wherein the second charger comprises a charger verification module which communicates with the battery pack verification module for verification; after passing the verification of the battery pack verification module, the second charger directly charges the battery pack.

4. The charging and discharging system with anti-counterfeiting function of the battery pack for the electric tool, as recited in claim 1, wherein: the battery pack verification communicates with the adapter verification module in an induction or contact mode.

5. The charging and discharging system with anti-counterfeiting function of the battery pack for the electric tool, as recited in claim 2, wherein: the battery pack verification communicates with the adapter verification module in an induction or contact mode.

6. The charging and discharging system with anti-counterfeiting function of the battery pack for the electric tool, as recited in claim 3, wherein: the battery pack verification communicates with the adapter verification module in an induction or contact mode.

7. The charging and discharging system with anti-counterfeiting function of the battery pack for the electric tool, as recited in claim 1, wherein: the adapter verification module and the battery pack verification module are paired RFID (radio frequency identification) tags, or paired RFID modules, or paired Bluetooth communication modules.

8. The charging and discharging system with anti-counterfeiting function of the battery pack for the electric tool, as recited in claim 2, wherein: the adapter verification module and the battery pack verification module are paired RFID (radio frequency identification) tags, or paired RFID modules, or paired Bluetooth communication modules.

9. The charging and discharging system with anti-counterfeiting function of the battery pack for the electric tool, as recited in claim 3, wherein: the adapter verification module and the battery pack verification module are paired RFID (radio frequency identification) tags, or paired RFID modules, or paired Bluetooth communication modules.

10. The charging and discharging system with anti-counterfeiting function of the battery pack for the electric tool, as recited in claim 6, wherein: the adapter verification module and the battery pack verification module are paired RFID (radio frequency identification) tags, or paired RFID modules, or paired Bluetooth communication modules.

11. The charging and discharging system with anti-counterfeiting function of the battery pack for the electric tool, as recited in claim 1, wherein: the battery pack further comprise a network communication module for sending service conditions to a server.

12. The charging and discharging system with anti-counterfeiting function of the battery pack for the electric tool, as recited in claim 2, wherein: the battery pack further comprise a network communication module for sending service conditions to a server.

13. The charging and discharging system with anti-counterfeiting function of the battery pack for the electric tool, as recited in claim 3, wherein: the battery pack further comprise a network communication module for sending service conditions to a server.

14. The charging and discharging system with anti-counterfeiting function of the battery pack for the electric tool, as recited in claim 10, wherein: the battery pack further comprise a network communication module for sending service conditions to a server.

15. The charging and discharging system with anti-counterfeiting function of the battery pack for the electric tool, as recited in claim 1, further comprising an external communication verification module which communicates with the battery pack verification module, wherein a verification mode and a charging mode are inputted through the external communication verification module, so that the battery pack adopts a corresponding mode to charge the electric tool.

16. The charging and discharging system with anti-counterfeiting function of the battery pack for the electric tool, as recited in claim 10, further comprising an external communication verification module which communicates with the battery pack verification module, wherein a verification mode and a charging mode are inputted through the external communication verification module, so that the battery pack adopts a corresponding mode to charge the electric tool.

17. The charging and discharging system with anti-counterfeiting function of the battery pack for the electric tool, as recited in claim 14, further comprising an external communication verification module which communicates with the battery pack verification module, wherein a verification mode and a charging mode are inputted through the external communication verification module, so that the battery pack adopts a corresponding mode to charge the electric tool.

18. The charging and discharging method, as recited in claim 8, wherein: when charging the battery pack by the charger, the charge-discharge adapter firstly selects a corresponding protocol according to the charge interface of the charge-discharge adapter for communicating with the charger; if the communication is normally performed, the battery pack is charged by the charger, if the communication is abnormally performed, the battery pack is not charged by charger.

19. The charging and discharging method, as recited in claim 8, wherein: when charging the electric tool by the battery pack, the electric tool is electrically connected with the charge-discharge adapter, the charge-discharge adapter firstly selects a corresponding protocol according to the discharge interface of the charge-discharge adapter for communicating with the electric tool, if the communication is normally performed, the electric tool is charged by the battery pack; if the communication is abnormally performed, the electric tool is not charged by the battery pack.

20. A charging and discharging method of a battery pack for an electric tool, comprising steps of:
(1) providing the battery pack which comprises a battery pack verification module;
(2) providing a charge-discharge adapter which has a charge interface and a discharge interface, wherein the charge interface is connected with a charger, the discharge interface is connected with the electric tool, the charge-discharge adapter comprises an adapter verification module; and
(3) electrically connecting the charge-discharge adapter with the battery pack, communicating the battery pack verification module with the adapter verification module, wherein the battery pack performs authentication on the charge-discharge adapter, while passing the authentication of the battery pack, the charge-discharge adapter controls the battery pack to charge or discharge; otherwise, the charge-discharge adapter does not work.

* * * * *